United States Patent [19]
Rainville

[11] 3,950,468
[45] Apr. 13, 1976

[54] INJECTION BLOW MOLDING OF CONTAINER OPEN AT BOTH ENDS

[76] Inventor: Dewey Rainville, 11 Kent Place, Westfield, N.J. 07090

[22] Filed: Aug. 19, 1974

[21] Appl. No.: 498,472

[52] U.S. Cl. .......... 264/97; 264/318; 425/DIG. 209; 425/DIG. 214
[51] Int. Cl.² ........................................ B29C 17/07
[58] Field of Search ......... 264/89, 94, 97, 318, 328, 264/387 B; 425/242 B, 324 B, DIG. 209, 214

[56] References Cited
UNITED STATES PATENTS

| | | | |
|---|---|---|---|
| 3,313,873 | 4/1967 | Dembiak | 264/328 X |
| 3,597,517 | 8/1971 | Smith | 264/97 |
| 3,854,191 | 12/1974 | Holbrook | 264/328 X |

FOREIGN PATENTS OR APPLICATIONS

| | | | |
|---|---|---|---|
| 1,047,183 | 11/1966 | United Kingdom | 425/DIG. 209 |

Primary Examiner—Jan H. Silbaugh

[57] ABSTRACT

This is a method for injection blow molding plastic articles having an opening at both ends. Parisons are injected over core rods that extend all the way across the cavity of an injection mold so that the core rod extends beyond both ends of the parison. The parison is injected by "subterranean" gating, and cylindrical ends of the parison are confined in the blowing mold while the portions of the parison between the ends are blown by opening a blowing fluid outlet intermediate the ends of the core rod. Grooves in the core rod near both ends of the parison prevent shrinkage of the plastic as it cools and prevent shortening of the length of the parison.

12 Claims, 4 Drawing Figures

INJECTION BLOW MOLDING OF CONTAINER OPEN AT BOTH ENDS

BACKGROUND AND SUMMARY OF THE INVENTION

This invention makes injection blow molded articles which can be used as containers or applicators; but which require that both ends of the article must be open. The article may have threaded ends for receiving caps or other means for closing the open ends but in the use of the article it is necessary to have a construction where either of both ends can be opened when necessary.

The articles made by this invention are preferably constructed with end portions having cylindrical cross sections for the portion of the length of the article inward from each end. Such articles cannot be made by ordinary injection molded techniques because only one end of the article is open and additional operations subsequent to blowing are necessary in order to have the other end open. This invention, however, completes the article with both ends open and does not require any subsequent operation.

The prior art has made articles of the type with which this invention is concerned, by injection molding and without blowing. Injection processes without blowing require that the thickness of the article molded be greater than is necessary with injection blow molding. A saving of approximately 40% in the material used can be effected by making articles by this invention which were formerly made by injection molding without blowing.

Special apparatus is necessary for the method of this invention; and both the novel method and apparatus will be described as the specification proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
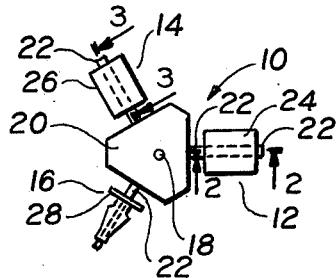
FIG. 1 is a top plan view of injection blow molding apparatus modified for use in carrying out the method of this invention.

FIG. 1 shows an injection blow molding machine 10 having an injection station 12; a blowing station 14 and a stripper station 16. These operational stations are located at angularly related positions around a center shaft 18 that carries an indexing head 20 which serves as the support for core rods 22. There is an injection mold 24 at the injection station 12 and this mold will be described in connection with FIG. 2. The blowing mold 26 at the blowing station 14, and the mold 26 will be described in connection with FIG. 3. At the stripper station 16 there is a stripper 28 for pushing blown articles from the core rod 22 and the stripper station is of conventional construction.

Figure 2:
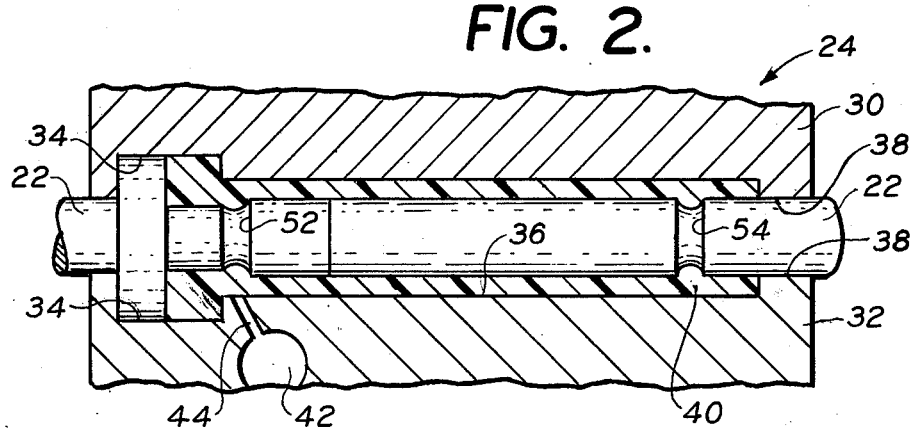
FIG. 2 is a greatly enlarged sectional view taken on the line 2—2 of FIG. 1.

FIG. 2 is a sectional view through a portion of the height of the injection mold 24. This mold 24 includes an upper section 30 and a lower section 32. These sections are moved with respect to one another to open and close the mold in the conventional way. There are semi-circular recesses 34 confronting one another in the upper and lower mold sections 30 and 32. These recesses, which are shaped to accommodate the different diameters of the core rod 22 at different locations along the length of the core rod, as shown, hold the core rod firmly in place when the mold 24 is closed. This is conventional construction.

The special construction of this invention includes the feature by which the core rod 22 extends all the way through the mold 24 so that the core rod protrudes beyond the end of the mold. This protrusion is not essential; but it is essential that the core rod 22 extends for the full length of a cavity 36 located within the mold 24.

The core rod 22 beyond the right hand end of the cavity 36 is gripped between semi-circular recesses 38 in the mold 24 beyond the end of the cavity 36. These recesses 38 grip the core rod with sufficient force to prevent plastic of a parison 40 from leaking from the cavity 36 through any clearance around the core rod 22 at the recesses 38.

Since the core rod 22 extends across the full length of the cavity 36, it is necessary to inject the plastic material 40 into the cavity 36 at a location between the ends of the cavity. In the construction shown there is a passage 42 into which molten plastic is injected from a conventional plasticizer, not shown. A runner 44 extends from the passage 42 into the mold cavity 36. There may be several runners 44 leading from the passage 42 into the cavity 36 at angularly spaced locations around the circumference of the cavity 36.

The injection of molten plastic into an injection mold cavity in the manner shown in FIG. 2 is referred to sometimes as "neck gating" or "subterranean gating." For purposes of this invention the molten plastic can be injected at one or more locations along the length of the cavity 36.

In the construction illustrated in FIG. 2, the parison formed by the plastic 40 is of cylindrical cross section across its entire length; but of somewhat larger cross section at the neck end. For most articles made by this invention it is desirable to have the end portions cylindrical; but the part of the parison between the cylindrical end portions may be of varying thickness along its length depending upon the amount that the material of the parison will be stretched at different locations during the blowing operation.

Figure 3:
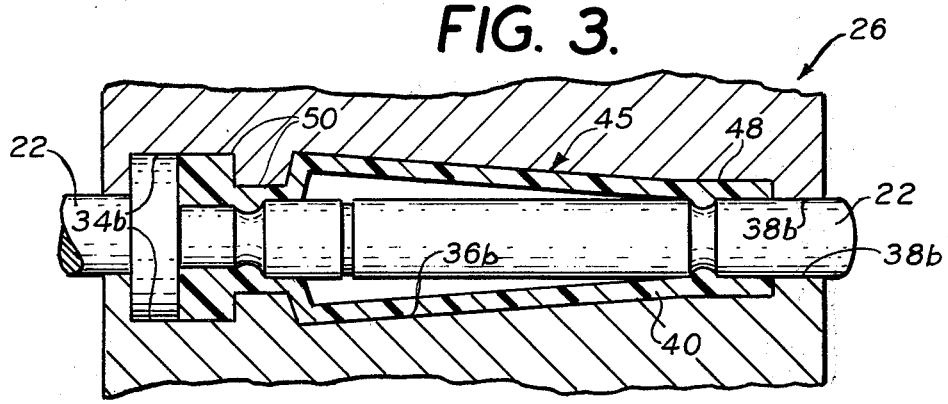
FIG. 3 is a greatly enlarged view taken on the section line 3—3 of FIG. 1.

FIG. 3 shows a section through the blowing mold 26. Both ends of the core rod 22 are gripped in recesses 34b and 38b which are the same as the corresponding recesses 34 and 38 of the mold 24 shown in FIG. 2.

The blowing mold 26 has a cavity 36b and this cavity is shaped to the desired shape of the article to be blown. In FIG. 3 the plastic material 40 has already been blown to the shape of the cavity 36b. The blown article is designated in FIGS. 3 and 4 by the reference character 45.

The cylindrical right hand end portion of the parison, designated by the reference character 48 retains the same shape in the blowing mold 26 as it had in the injection mold 24 and the same is true of the large and small diameter portions of the left hand cylindrical part of the parison, designated in FIG. 3 by the reference character 50. These portions 48 and 50 of the plastic 40 are molded in the injection mold cavity to their final shape in the preferred embodiment of the invention.

The blowing mold cavity 36b (FIG. 3) is shaped to the final shape of the article 45 between the cylindrical end portions 48 and 50.

The plastic 40 tends to shrink as it cools. In order to prevent the parison on the core rod 22 from becoming shorter as it cools before being blown in the mold 26 there are shallow grooves 52 and 54 formed in the circumference of the core rod 22 near the opposite ends of the parison. The plastic material which is injected into these shallow grooves 52 and 54 forms an internally projecting bead which, because of the viscosity of the plastic 40, prevents the end portions of the plastic 40 from moving toward one another as the result of shrinkage. The shrinkage, instead of shortening the parison, appears as a stretching of the plastic between the grooves 52 and 54 so that the wall thickness of the parison is slightly less by the time the core rod reaches the blowing mold. The grooves 52 and 54 are preferably placed at locations to prevent stretching of any part of the length of the cylindrical portions 48 and 50 which are to be held to their original dimensions in the blowing mold 26.

Figure 4:
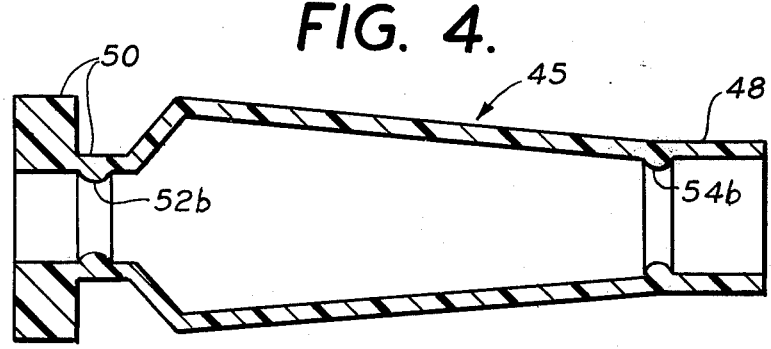
FIG. 4 is an enlarged sectional view of the article made in accordance with the method of this invention.

FIG. 4 shows the article 45 after being stripped from the core rod. The beads 52b and 54b which are formed by the plastic which is injected into the shallow grooves 52 and 54, do not prevent the cooled article 54 from being stripped from the core rod at the stripper station. The cooled plastic has sufficient elasticity to stretch as much as necessary for the beads 52b and 54b to be expanded to the adjacent diameter of the core rod by the cam action of the sloping sides of the shallow grooves 52 and 54.

Either or both ends of the article 45 can be made with threads if the cavity 36 of the mold 24 is formed with threads, and the cavity 36b of the blowing mold 36 has recesses shaped to receive to threads.

The preferred embodiment of the invention has been illustrated and described, but changes and modifications can be made, and some features can be used in different combinations without departing from the invention as defined in the claims.

What is claimed is:

1. The method of blow molding a container that is open at both ends, which method includes applying a molten plastic parison to a core rod in an injection mold, applying the parison around all sides of the core rod and leaving portions of the sides of the core rod, at both ends of the parison, free of any coating by the parison, transferring the core rod with the parison thereon, from the injection mold to a blowing mold, with the parison still at an elevated temperature for blowing, holding both ends of the core rod in the blowing mold, confining both end portions of the parison, adjacent to opposite ends thereof, in the blowing mold so as to provide necks at opposite ends for a parison, and blowing the intermediate part of the parison, between the confined necks, to the desired shape of a body portion of the container between the necks which form the opposite open ends of the blown container.

2. The method described in claim 1 characterized by holding the parison against expansion at both end portions of the parison during the blowing operation.

3. The method described in claim 1 characterized by injecting the plastic into the injection mold cavity at a location on one side of the core rod and intermediate the end portion of the core rod.

4. The method described in claim 3 characterized by injecting the plastic into the cavity from a location near one end of the cavity.

5. The method described in claim 3 characterized by injecting the plastic into the cavity by subterranean gating.

6. The method described in claim 1 characterized by holding the parison against shrinking in length, as it cools, by injecting some of the plastic into shallow circumferential grooves in the core rod adjacent to both ends of the injection mold cavity.

7. The method described in claim 1 characterized by limiting the length of the parison on the core rod by gripping the core rod in recesses at opposite ends of the cavity of the injection mold into which the parison is injected and applied to the core rod.

8. The method described in claim 1 characterized by forming a flange on one end of the parison at the neck portion of the parison.

9. The method of molding described in claim 1 characterized by molding opposite ends of the parison in the injection mold with neck portions that are of substantially uniform diameter for a portion of the axial length of each end of the parison.

10. The method described in claim 9 characterized by gripping the core rod between upper and lower confronting surfaces of recesses in upper and lower sections of the injection mold beyond the cavity of the injection mold, said gripping being tight and preventing plastic injected into the mold from escaping along portions of the core rod that are gripped by the injection mold beyond both ends of the injection mold cavity.

11. The method described in claim 1 characterized by the injection, molding and stripping of the container being performed at operational stations angularly related to one another about a center axis, supporting the core rods from a common support at the same angular spacing as the operational stations, and moving the core rods substantially simultaneously from one station to the next.

12. The method described in claim 1 characterized by opening a fluid inlet in the core rod, intermediate the ends of the core rod to blow the parison in the blowing mold.

* * * * *